United States Patent
Karasawa et al.

(12) United States Patent (10) Patent No.: US 6,761,993 B1
(45) Date of Patent: Jul. 13, 2004

(54) ELECTRODE PLATE UNIT FOR RECHARGEABLE BATTERY AND MANUFACTURING METHOD THEREOF

(75) Inventors: Shoji Karasawa, Kosai (JP); Hiromi Kajiya, Toyohashi (JP); Yoshihiro Tokutome, Toyota (JP); Akihiro Taniguchi, Toyohashi (JP); Noriyuki Fujioka, Kosai (JP); Masaru Masaki, Nisshin (JP)

(73) Assignees: Matsushita Electric Industrial Co., Ltd., Osaka (JP); Toyota Jidosha Kabushiki Kaisha, Aichi (JP)

(*) Notice: Subject to any disclaimer, the term of this patent is extended or adjusted under 35 U.S.C. 154(b) by 39 days.

(21) Appl. No.: 09/664,323
(22) Filed: Sep. 18, 2000

(30) Foreign Application Priority Data

Sep. 21, 1999 (JP) .............................................. 11-267001

(51) Int. Cl.⁷ .............................................. H01M 2/26
(52) U.S. Cl. ....................................... 429/161; 429/211
(58) Field of Search ................................ 429/161, 211; 29/623.1

(56) References Cited

U.S. PATENT DOCUMENTS

| | | | |
|---|---|---|---|
| 3,650,842 A | | 3/1972 | Bougaran |
| 3,732,124 A | * | 5/1973 | Cailley .......................... 429/94 |
| 3,761,314 A | | 9/1973 | Cailley |
| 3,960,603 A | | 6/1976 | Morioka et al. |
| 4,053,687 A | * | 10/1977 | Coibion et al. .............. 429/174 |
| 4,138,533 A | | 2/1979 | Steig |
| 4,332,867 A | * | 6/1982 | Tsuda et al. .................... 429/94 |
| 4,554,227 A | * | 11/1985 | Takagaki et al. ............. 429/178 |
| 5,047,300 A | | 9/1991 | Juergens |
| 5,227,267 A | | 7/1993 | Goebel et al. |
| 5,415,954 A | | 5/1995 | Gauthier et al. |
| 5,655,295 A | * | 8/1997 | Sugikawa ...................... 29/879 |
| 5,674,641 A | * | 10/1997 | Cheu ........................ 429/231.5 |
| 5,840,087 A | * | 11/1998 | Gozdz et al. ................. 156/182 |
| 5,871,861 A | * | 2/1999 | Hirokou et al. .............. 429/149 |
| 5,972,532 A | * | 10/1999 | Oweis et al. ................. 429/211 |
| 6,120,930 A | * | 9/2000 | Rouillard et al. ............ 429/120 |
| 6,304,057 B1 | * | 10/2001 | Hamada et al. .............. 320/107 |
| 6,432,574 B1 | * | 8/2002 | Suzuki et al. .................. 429/94 |
| 2001/0036574 A1 | * | 11/2001 | Fukuda et al. ............... 429/161 |

FOREIGN PATENT DOCUMENTS

| | | |
|---|---|---|
| EP | 0955682 | 11/1999 |
| EP | 1076371 | 2/2001 |
| FR | 1415519 | 10/1965 |
| JP | 58-115757 | 7/1983 |

(List continued on next page.)

OTHER PUBLICATIONS

English Language Abstract of JP 7–220715.
English Language Abstract of JP 7–245092.
English Language Abstract of JP 10–189055.
English Language Abstract of JP 2000–58038.
English Language Abstract of JP2000–260417.
English Language Abstract of JP 7–326336.
English Language Abstract of JP 58–115757.
English Language Abstract of JP 63–261672.
English Language Abstract of JP 11–111261.
English Language Abstract of JP 10–106536.
English Language Abstract of JP 9–306535.

*Primary Examiner*—Susy Tsang-Foster
(74) *Attorney, Agent, or Firm*—Greenblum & Bernstein, P.L.C.

(57) ABSTRACT

A plurality of positive electrode plates and negative electrode plates are stacked alternately upon one another with intervening separators therebetween, wherein lateral edges of the positive electrode plates protrude beyond the negative electrode plates on one side, and lateral edges of the negative electrode plates protrude beyond the group of positive electrode plates on the opposite side. Collector plates are brought in tight contact with respective lateral edges of the positive and negative electrode plates, and heat is applied to the collector plate on an opposite surface of the electrode plates from a non-contact type heat source at several locations in lines along a direction in which the electrode plates are stacked.

10 Claims, 14 Drawing Sheets

FOREIGN PATENT DOCUMENTS

| | | |
|---|---|---|
| JP | 60-7058 | 1/1985 |
| JP | 60-7058 A * | 1/1985 |
| JP | 60121668 | 6/1985 |
| JP | 62243245 | 10/1987 |
| JP | 63-261672 | 10/1988 |
| JP | 7-220715 | 8/1995 |
| JP | 7-245092 | 9/1995 |
| JP | 7-326336 | 12/1995 |
| JP | 9-306535 | 11/1997 |
| JP | 10-106536 | 4/1998 |
| JP | 10-189055 | 7/1998 |
| JP | 11-111261 | 4/1999 |
| JP | 11185724 | 7/1999 |
| JP | 2000-58038 | 2/2000 |
| JP | 2000-260417 | 9/2000 |
| WO | 97/18594 | 5/1997 |

* cited by examiner

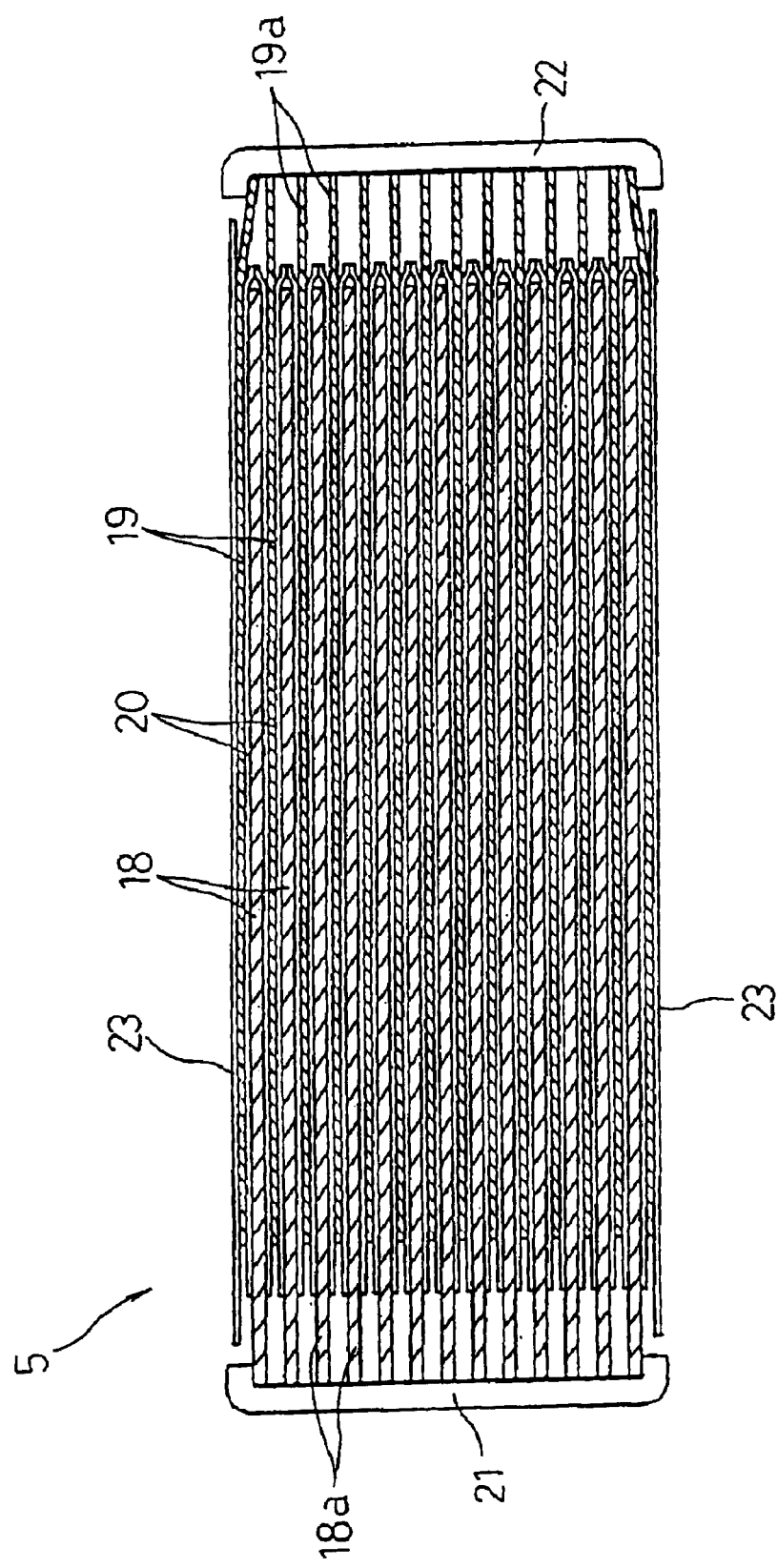

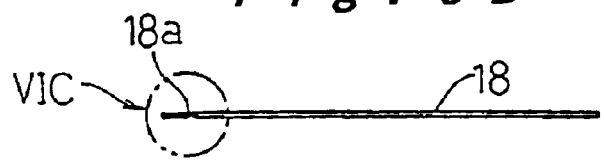
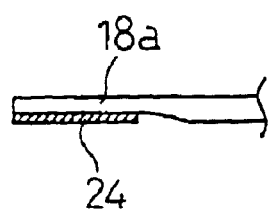
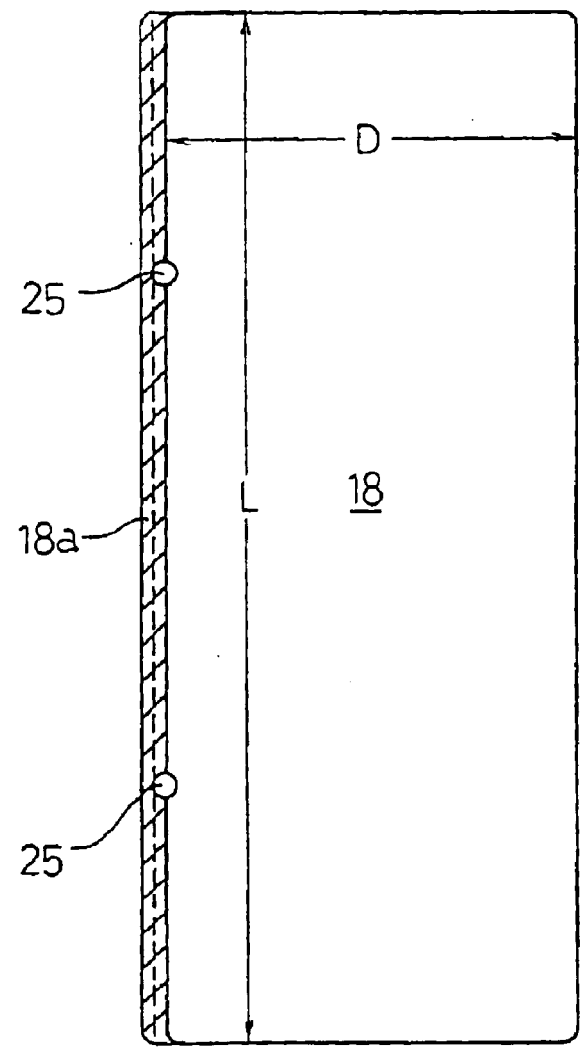

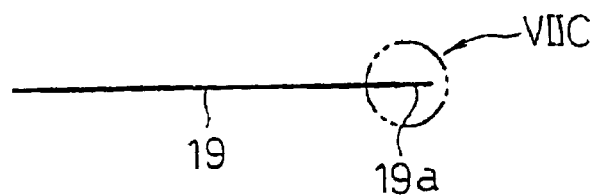
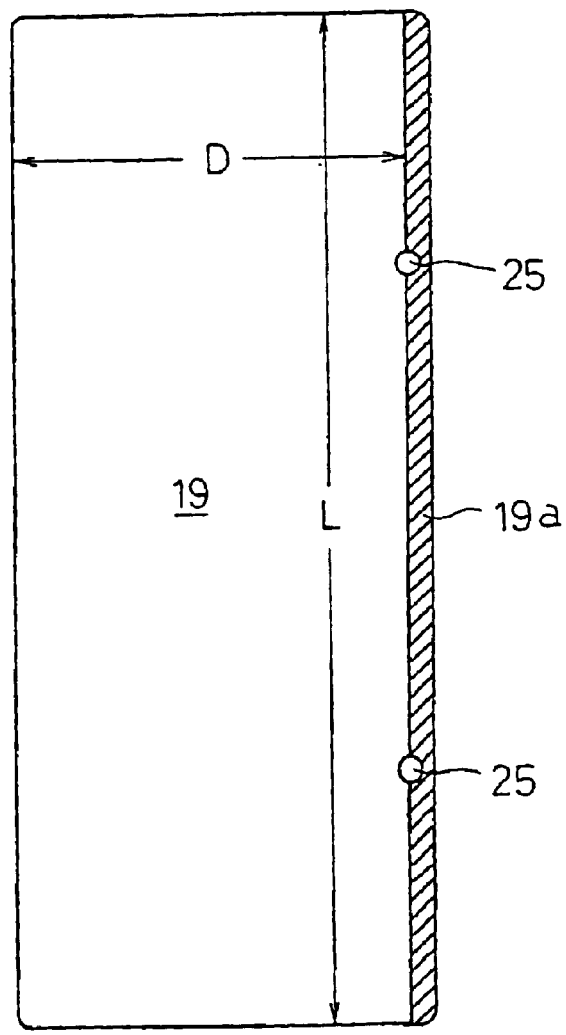
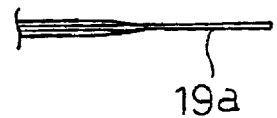

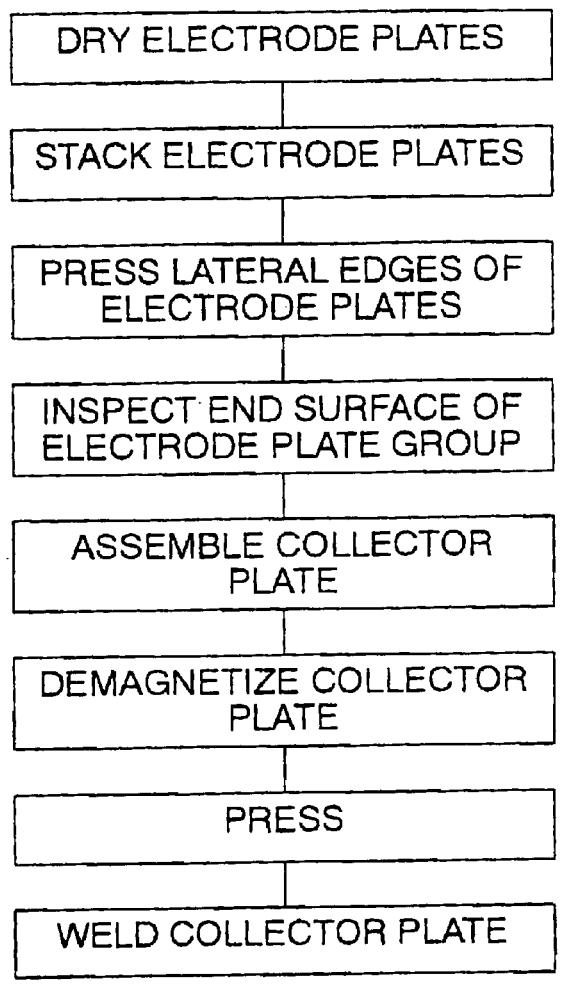
Fig. 8
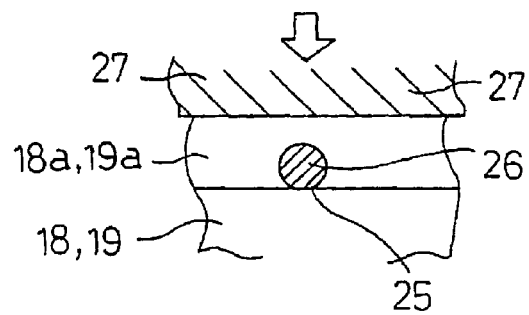
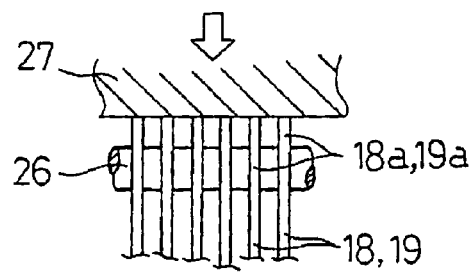
Fig. 9A   Fig. 9B

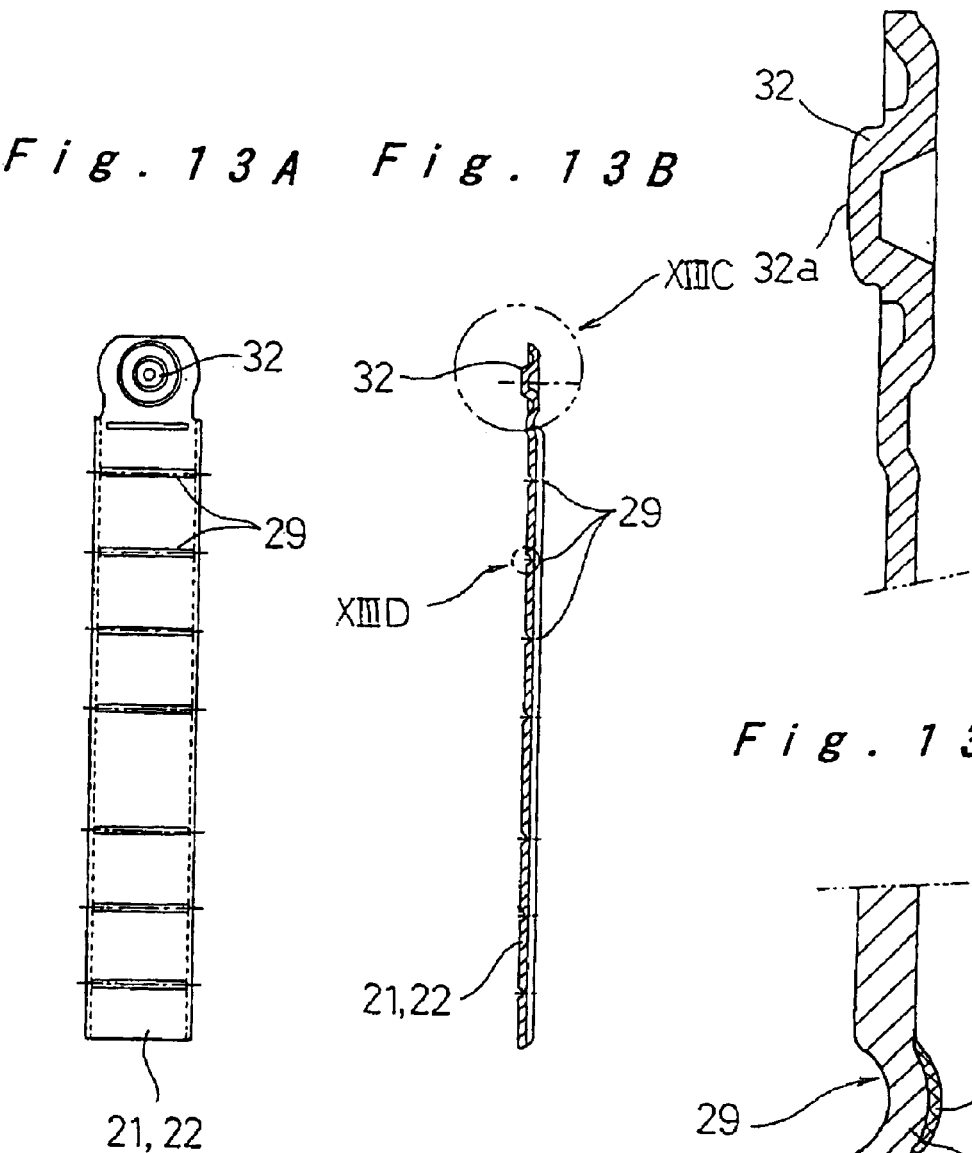

ELECTRODE PLATE UNIT FOR RECHARGEABLE BATTERY AND MANUFACTURING METHOD THEREOF

CROSS REFERENCE TO RELATED APPLICATION

The present disclosure relates to subject matter contained in priority Japanese Patent Application No. HEI 11-267001, filed Sep. 21, 1999.

BACKGROUND OF THE INVENTION

1. Field of the Invention

The present invention relates to an electrode plate unit for a rechargeable battery and a manufacturing method of same.

2. Description of Related Art

Batteries are classified into primary batteries and secondary batteries or rechargeable batteries, and there are various configurations for each of these two types of battery. FIG. 17 shows a conventional battery module made by connecting a plurality of rechargeable batteries and coupling them together as one so as to obtain the necessary power. In this battery module, a plurality of cells 41 (41a to 41j) made of sealed alkaline rechargeable batteries as shown in FIG. 18 are arranged side by side, with the long lateral walls of their battery cases 42 adjacent each other. End plates 52 are arranged against the outside of the cells 41a and 41j at both ends, and the group of batteries and the two end plates 52 are bound together with binding bands 53 so as to couple the cells together as one piece.

For the cells 41, an electrode plate group 47, comprising positive electrode plates and negative electrode plates layered with intervening separators, thereby constituting elements for electromotive force, is accommodated in a battery case 42 together with a liquid electrolyte, and the open end of the battery case 42 is closed with a lid 46 provided with a safety vent 45. From the upper end at one side of the positive electrode plates forming the electrode plate group 47, leads 49 extend upward and are connected to a positive electrode terminal 43 above them, and similarly, from the upper end of the other side of the negative electrode plates, leads 49 extend upward and are connected to an negative electrode terminal 44 above them. The positive electrode terminal 43 and the negative electrode terminal 44 are attached to the lid 46.

The positive electrode terminals 43 and negative electrode terminals 44 of coupled neighboring cells 41 are connected by connection plates 51, thereby connecting all cells 41 in series. When the battery cases 42 are coupled, ribs 48, which protrude vertically from the long lateral walls of the battery cases 42, are abutted against each other, forming coolant passages running in the vertical direction along the long lateral walls of the battery cases 42 in the space between ribs 48. The cells 41a to 41j are cooled by flowing air through these coolant passages.

The leads 49 are integrated to the electrode plate group 47 by welding. For the welding of the leads, according to Japanese Laid-Open Patent Application 7-220715, for example, laser welding is used more favorably than resistance welding, because, in resistance welding, the welding defects are often formed by the generation of sparks caused by oxide films or other foreign substances that exist in the welding portion, and uniform welding cannot always be accomplished. Thus laser welding is more favorably applied, and specifically, leads are usually provided with through-holes, through which laser beams are passed, whereby these through-holes are closed with molten metal, and when the metal eventually cools down and sets, the leads are integrally welded together.

With the configuration for the cells 41 of this conventional battery module, leads 49 extend from a portion at the upper end on one side of the electrodes and are connected to the electrode terminals 43 and 44, and consequently, there were the problems that the internal resistance of the battery was large, because the average distance from the surface of the electrodes to the collector portions of the leads 49 was long, and that the power output was low, because the utilization rate of the electrode active material was low.

The inventors of the present application have proposed an electrode plate unit for a rechargeable battery, wherein collector plates are abutted on the entire surface of the opposite lateral ends of the group of electrode plates, with lateral edges of each of electrode plates being integrally welded to the collector plates. In connecting the lateral edges of the electrode plates to the collector plates, however, sufficient bond cannot be achieved in the case of employing a seam-welding method, with the result that power output of the battery is decreased, or the welding strength is low. On the other hand, if laser welding is used, it is difficult to accomplish secure bonding of electrode plates with the collector plates without causing any adverse effects to the electrode plates. Accordingly, there is the need for a method of bonding lateral edges of electrode plates with collector plates in a favorable condition.

SUMMARY OF THE INVENTION

In view of these problems of the prior art, it is an object of the present invention to provide an electrode plate unit for a rechargeable battery, in which one lateral edge of an electrode plate group is securely bonded to a collector plate, and to a manufacturing method thereof.

To achieve the above object, a battery according to one aspect of the present invention comprises an electrode plate unit, including:

a plurality of positive electrode plates and a plurality of negative electrode plates that are alternately stacked upon one another with intervening separators therebetween, thereby constituting a group of electrode plates, wherein lateral edges of the positive electrode plates protrude beyond the negative electrode plates on one side, and lateral edges of the negative electrode plates protrude beyond the group of positive electrode plates on the opposite side; and a positive electrode collector plate and a negative electrode collector plate that are respectively bonded to said protruded lateral edges of the positive electrode plates and the negative electrode plates, wherein the positive electrode collector plate and the negative electrode collector plate are formed with protruded portions on a surface which is to be bonded to the lateral edges of the positive electrode plates and the negative electrode plates.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 5 is a cross-sectional view taken in the direction of the arrows along the line V—V in FIG. 4;

FIG. 6A is a front view, FIG. 6B is a top plan view, and FIG. 6C is an enlargement of VIC in FIG. 6B, showing a positive electrode plate in the same embodiment;

FIG. 7A is a front view, FIG. 7B is a top plan view, and FIG. 7C is an enlargement of VIIC in FIG. 7B, showing a negative electrode plate in the same embodiment;

FIG. 8 is a flow chart of a manufacturing method of the electrode plate unit;

FIG. 9A is a partial front view and FIG. 9B is a partial side view showing one process step of manufacturing the electrode plate unit;

FIG. 13A is a front view, FIG. 13B is a longitudinal side elevation view, FIG. 13C is an enlargement of XIIIC in FIG. 13B, and FIG. 13D is an enlargement of XIIID in FIG. 13B, showing a modification of the collector plate;

DESCRIPTION OF PREFERRED EMBODIMENTS

One embodiment of a battery module, to which an electrode plate unit for a battery according to the present invention is applied, will be hereinafter described with reference to FIGS. 1 to 12.

Figure 1:
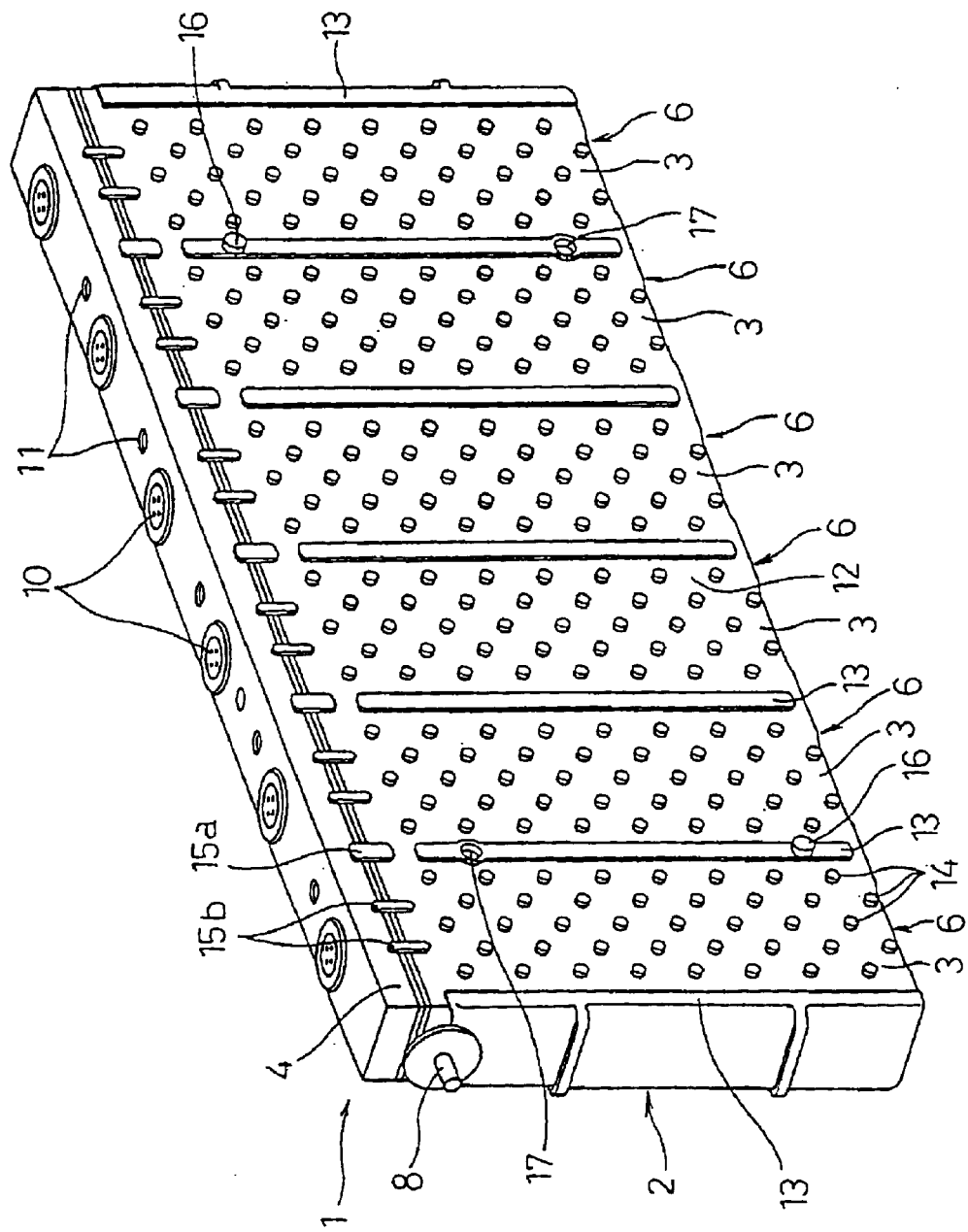
FIG. 1 is an external perspective view of a battery module according to one embodiment of the present invention.
Figure 2:
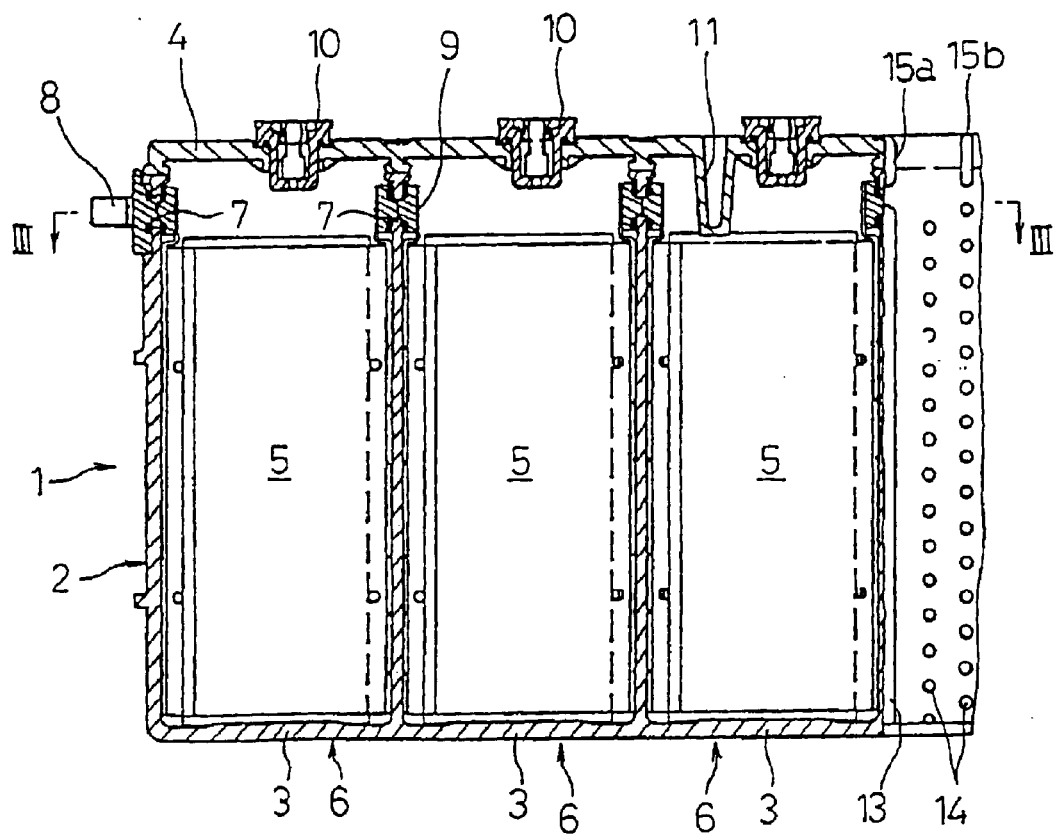
FIG. 2 is a partial lateral cross-sectional view of the same.
Figure 3:
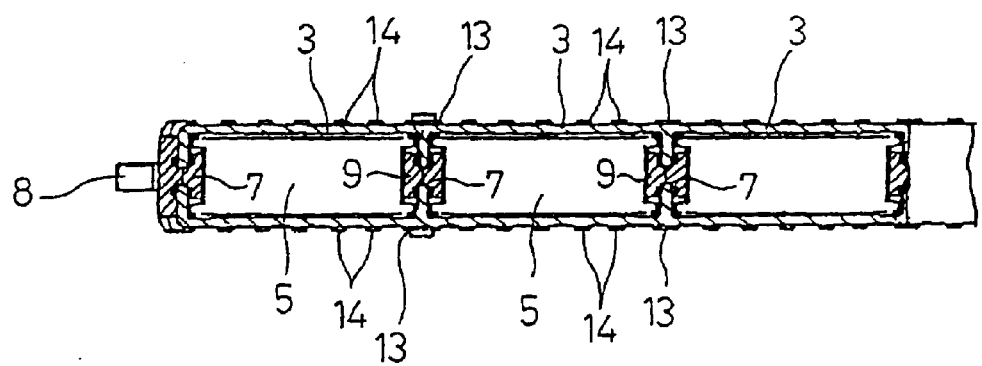
FIG. 3 is a cross-sectional view taken in the direction of the arrows along the line III—III in FIG. 2.

First, the overall construction of the battery module 1 in accordance with this embodiment is described with reference to FIGS. 1 to 7. The battery module of this embodiment is a nickel metal hydride battery, which is suitable for use as a drive power source for an electric vehicle. As shown in FIGS. 1 to 3, the battery module 1 is made up of a plurality of (six in the example shown in the drawing) cells 6, arranged in a row. Cell cases 3 of each of the cells 6, which are formed in a prismatic fashion with short lateral walls, long lateral walls, and open top ends, are mutually integrated on their short lateral walls, thereby constituting an integral battery case 2. The upper open ends of the cell cases 3 are closed all together by an integral lid member 4.

Each of the battery cases 3 constitutes a cell 6, accommodating therein an electrode plate unit 5 together with electrolyte. The electrode plate group 5 comprises a large number of positive electrode plates and negative electrode plates arranged parallel to the long lateral walls of the cell cases 3 and layered in the direction of the short lateral walls of the cell cases 3, with intervening separators therebetween. The construction inside the battery case will be described later in more detail.

Connection holes 7 are formed at the upper edge portions of the outer short lateral walls of the cell cases 3 at the two ends of the integral battery case 2 and between each two cell cases 3. Positive and negative connection terminals 8 are respectively mounted to the connection holes 7 at the outer short lateral walls of the two outer cell cases 3, and connection fittings 9 for serially connecting two adjacent cells 6 are mounted to the connection holes 7 in the intermediate short lateral walls between each two cell cases 3. In addition, the lid member 4 is provided with one safety vent 10 for each of the cell case 3, so as to release pressure when the internal pressure in the cell cases 3 has exceeded a certain value. Moreover, a sensor mounting hole 11 for mounting a temperature detection sensor for detecting the temperature of the cells 6 is formed at suitable cells 6 or for each cell 6.

The long lateral walls of six cells 6 together form an integral side wall 12 of the integral battery case 2. On this side wall 12 of the integral battery case 2, protruding ribs 13 that extend vertically are provided at positions corresponding to the lateral edges of two adjacent cell cases 3. Further, a large number of relatively small circular protrusions 14 are formed at suitable intervals in matrix fashion between each two ribs 13. The ribs 13 and the protrusions 14 have the same height. Furthermore, coupling ribs 15a and 15b having the same height as the ribs 13 and the protrusions 14 are formed on the side walls of the upper edge of the cell cases 3 and the side walls of the lid member 4, such as to bridge across the side walls of the cell cases 3 and the lid member 4, at positions corresponding to an extension of the ribs 13 and the protrusions 14. A plurality of protrusions 16 and indentations 17, for positioning and fitting together integral battery cases 2 when their side walls 12 are abutted on each other, are arranged at an upper portion and a lower portion of the outer surface of the two ribs 13 near both ends of the side wall 12 of the integral battery case 2. When a plurality of integral battery cases 2 are arranged in a row in parallel to constitute a battery module, the ribs 13, the protrusions 14 and the coupling ribs 15a and 15b form coolant passages for cooling the cell cases 3 effectively and uniformly.

Figure 4:
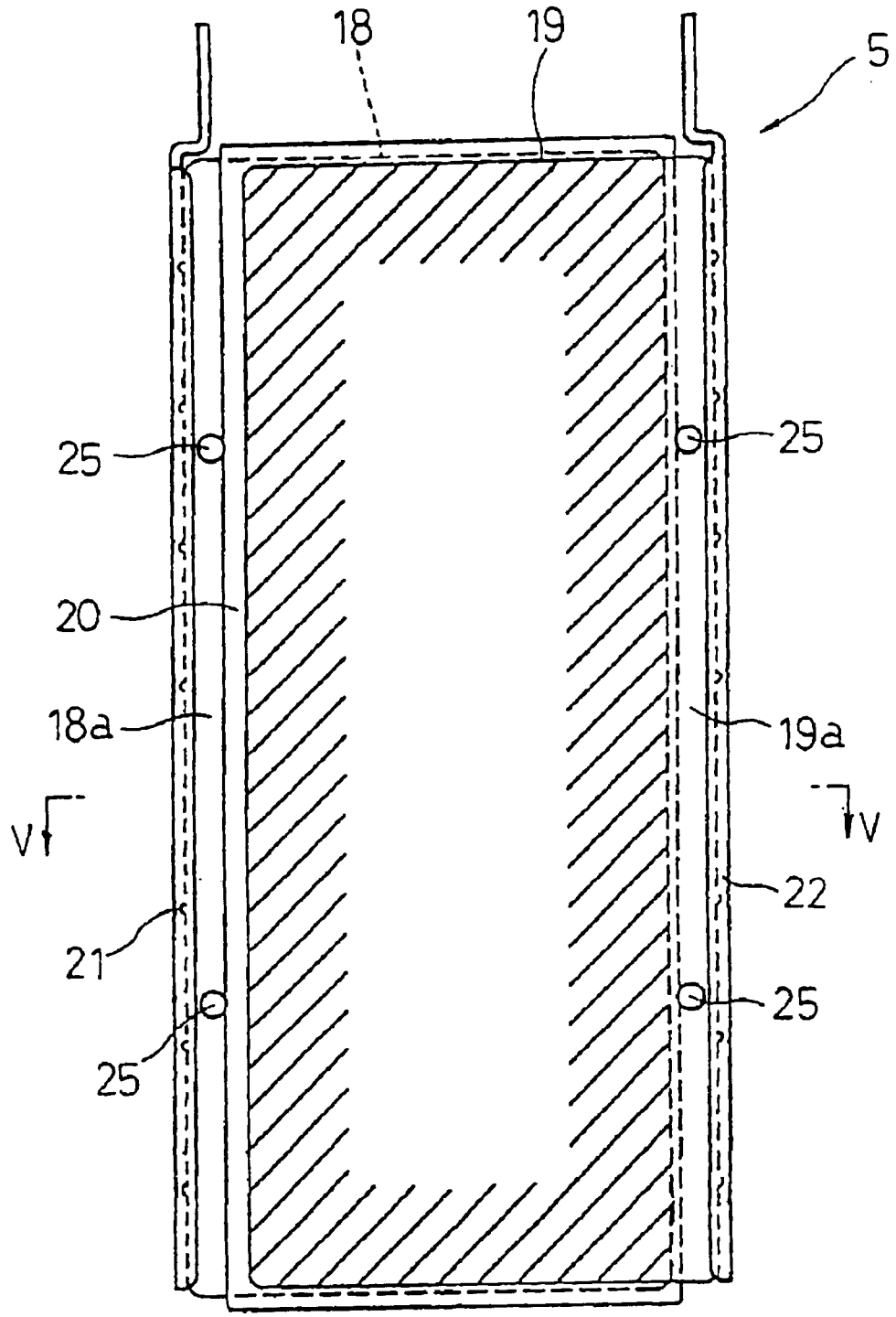
FIG. 4 is a front view of an electrode plate unit of the same embodiment.
Figure 10:
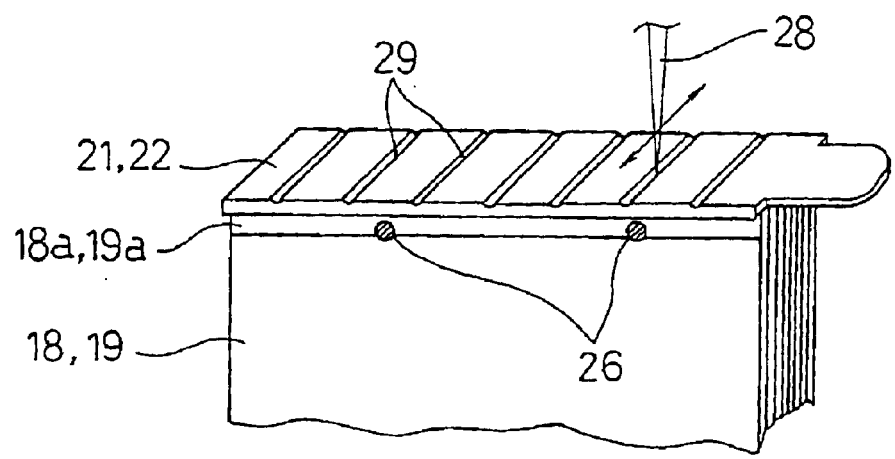
FIG. 10 is a perspective view showing one process step of welding a collector plate to the electrode plate group.
Figure 11A:
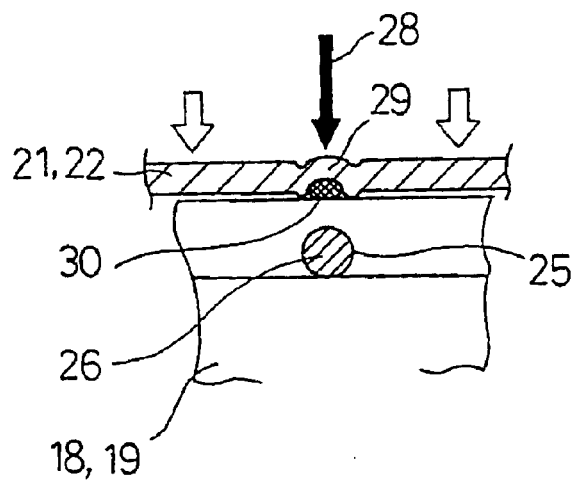
FIG. 11A is a partial front view and FIG. 11B is a partial side view showing the welding step of FIG. 10.
Figure 11B:
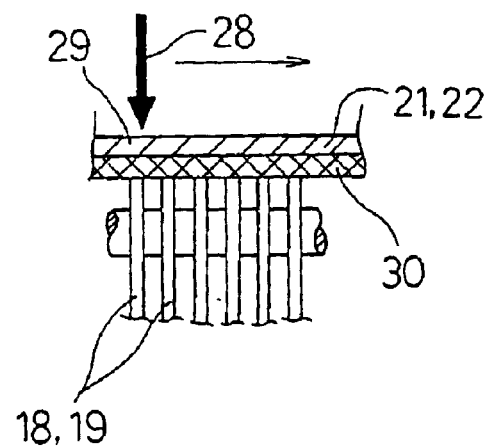

The aforementioned electrode plate groups 5 are explained in detail with reference to FIGS. 4 to 7. In FIGS. 4 and 5, a plurality of positive electrode plates 18 and negative electrode plates 19 are arranged alternately, and the positive electrode plates 18 are covered with separators 20 in the form of a bag having an opening on one side. The positive electrode plates 18 and the negative electrode plates 19 are stacked upon one another with separators 20 therebetween, thereby constituting the electrode plate unit 5. In FIG. 4, the region where the positive electrode plates 18 and the negative electrode plates 19 oppose each other with the intervening separators 20 and generate electric power is indicated by oblique lines. The lateral edges of the group of positive electrode plates 18 protrude beyond the group of negative electrode plates 19 on one side, and the lateral edges of the group of negative electrode plates 19 protrude beyond the group of positive electrode plates 18 on the opposite side, and these protruding lateral portions form the lead portions 18*a* and 19*a*, to the lateral ends of which collector plates 21 and 22 are welded, respectively. The outer edges of the collector plates 21 and 22 are bent toward the inside as shown in FIG. 5, in order to restrict the dimensions of the electrode plates 18, 19 during the collector plates 21, 22 are welded to the electrode plates 18, 19, so that the electrode plates 18, 19 do not spread outwards as pressure is applied thereto. Numeral 23 denotes external separators arranged at the outer faces of the electrode plate unit 5 between the collector plates 21 and 22.

The positive electrode plates 18 are made of Ni foamed metal. As shown in FIGS. 6A–6C, the lead portion 18*a* is constructed by compressing one lateral edge of the plate of foamed metal and attaching a lead plate 24 on one surface of the lead portion 18*a* by ultrasonic welding or seam welding. The negative electrode plates 19 shown in FIGS. 7A–7C are made of Ni punched metal coated with an active material except for lead portions 19*a*. "L" denotes the length of a side of the positive electrode plate 18 and the negative electrode plate 19 where the lead portions 18*a* and 19*a* are provided, and "D" denotes the length of the side in a direction perpendicular thereto. The positive and negative electrode plates 18, 19 are configured so that "L" is larger than "D", but not larger than four times "D". In FIGS. 4, 6A–6C, and 7A–7C, numeral 25 denotes pairs of locating holes formed in the lead portions 18*a* and 19*a* at a suitable distance from the top and the bottom thereof.

The detailed construction of the electrode plate unit 5 and the manufacturing method thereof will be described below with reference to FIGS. 8 to 12. FIG. 8 is a flow chart of the manufacturing steps. First, the positive electrode plates 18 and the negative electrode plates 19 fabricated as shown in FIGS. 6A and 7A respectively are completely dried, and then a predetermined number of positive and negative electrode plates 18, 19 are alternately stacked upon one another, with a separator 20 interposed between each pair of positive and negative electrode plates, whereby a group of electrode plates as shown in FIG. 5 is obtained but without collector plates 21, 22. These stacked electrode plates 18, 19 are then set in a suitable mold equipped with locating pins 26, such that the locating pins 26 are passed through corresponding locating holes 25 in the positive and negative electrode plates 18, 19. Then, the lateral edges of the electrode plates 18, 19 are pressed with a press 27 as shown in FIGS. 9A and 9B, so that the lateral edges of the electrode plates together form a flat end surface. Thereafter, the thus formed lateral end surface is inspected if it is flat. In case there is an electrode plate which is not flush with the flat end surface, such is removed as a defective one and replaced. Such inspection of end surface can be performed efficiently by way of laser focusing method or the like, so that the variation of electrode plates in their dimensions is less than 100 μm.

Next, collector plates 21, 22 are attached on each of the end surfaces of the electrode plate groups formed by the lateral edges of the groups of positive and negative electrode plates 18, 19 respectively, and the collector plates 21, 22 are demagnetized by applying an alternating magnetic field thereto. Then, an electronic beam 28 is irradiated to the backside, or the opposite side of the electrode plate group, of the collector plates 21, 22 within a vacuum, in a state wherein the collector plates 21, 22 are pressed against the electrode plates. The electronic beam 28 is scanned in directions in which the electrode plates are stacked as indicated by the arrow in FIG. 10, whereby the collector plates 21, 22 are welded to the lateral edges of the positive and negative electrode plates 18, 19, respectively. This welding operation is repeated in several locations at certain intervals along the lengthwise direction of the electrode plates 18, 19 simultaneously or successively. While the collector plates 21, 22 may be magnetized during the fabrication or transportation process thereof, since they are demagnetized beforehand as noted above, there is no risk that the electronic beam 28 is adversely affected by any magnetic force and welding performance fails.

Various other lasers such as $CO_2$ laser, YAG laser, semiconductor laser, or excimer laser can be used instead of electronic beam 28.

Figure 12A:
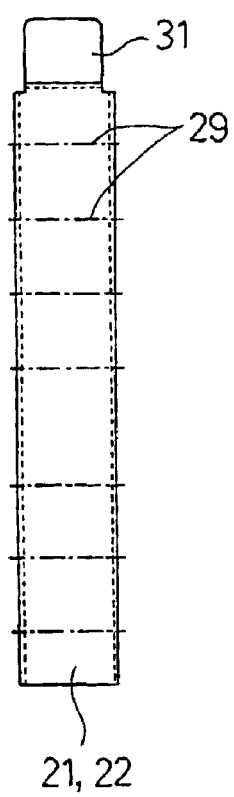
FIG. 12A is a front view.
Figure 12B:
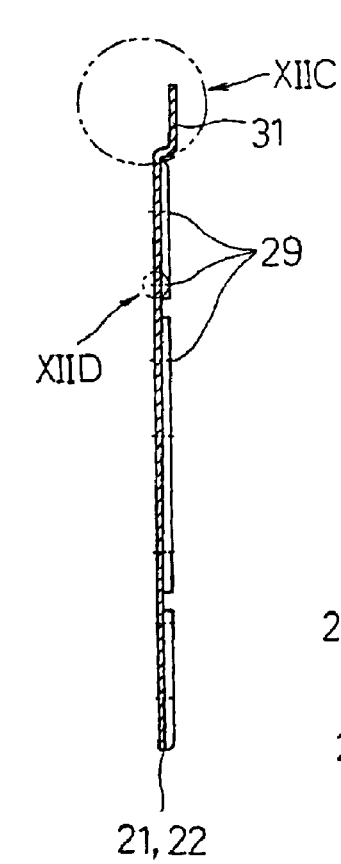
FIG. 12B is a longitudinal side elevation view.
Figure 12C:
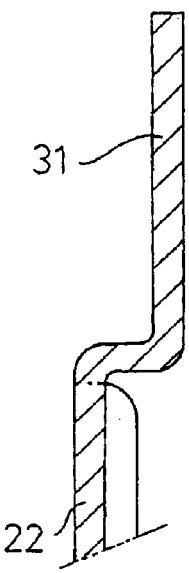
FIG. 12C is an enlargement of XIIC in FIG. 12B.
Figure 12D:
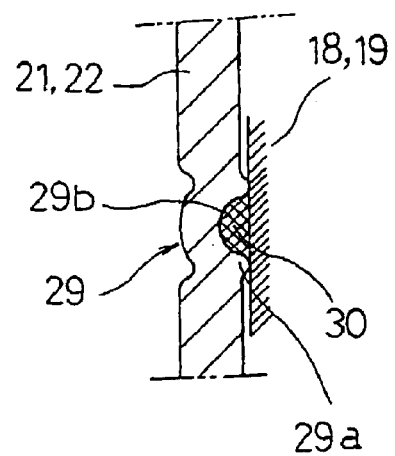
FIG. 12D is an enlargement of XIID in FIG. 12B, showing a collector plate in the same embodiment.

The collector plates 21, 22 are constructed of a nickel sheet or nickel-plated steel sheet, and formed with corrugated portions 29 at a plurality of positions (seven positions in the drawing) at suitable intervals in a lengthwise direction of the sheet, as shown in FIGS. 12A through 12D. The corrugated portion 29 partly protrudes toward the side of the electrode plates 18, 19, and a solder material 30 such as nickel solder is attached to a portion that makes contact with the lateral edges of the positive and negative electrode plates 18, 19. FIG. 12D shows in detail one example of the corrugated portion 29, wherein a groove 29*b* is formed on the top of the ridge 29*a* of the corrugated portion 29, this groove 29*b* being filled with the nickel solder material 30. Reference numeral 31 denotes part of the collector plate 21 or 22 on one end thereof which makes a welding portion to be welded with a connection fitting 9.

When attaching the nickel solder 30 on the collector plates 21, 22, the collector plates need to be thoroughly cleaned to remove oil components therefrom. The nickel solder may be obtained by mixing powder consisting of nickel metal alloy with binder into a paste. This is applied on the collector plates 21, 22 at desired locations in a predetermined amount, and the collector plates 21, 22 are then heated in a vacuum furnace at 450 to 800° C. for 10 to 30 minutes, whereby the nickel solder paste is reflowed. The collector plates 21, 22 should preferably be pressed afterwards to correct warping of the plates and to flatten out the reflowed portions.

According to the construction of the electrode plate unit and the manufacturing method thereof described above, lateral edges of the electrode plates 18, 19 can be brought in secure contact with collector plates 21, 22 and bonded reliably thereto, since the electrode plates 18, 19 have their respective lead portions 18*a*, 19*a* along one lateral edge, which is to be welded with a collector plate, where no active material is packed, and since these lead portions 18*a*, 19*a* include locating holes 25 for positioning the electrode plates with respect to the collector plate. Further, since the lead portion 18*a* of the positive electrode plate 18 that is made of metal foam and thus is low in strength is reinforced with the lead plate 24, sufficient strength for the lead portion 18*a* can be achieved, and the lead portion 18*a* is prevented from being irregularly deformed during welding, ensuring secure bond to the collector plate.

Furthermore, lateral edges of the positive and negative end plates 18, 19 are aligned straight by pressing the edges of the electrode plates, that have been located in position by means of the locating pins 26 and the corresponding holes 25, before placing the collector plates 21, 22 on the end surfaces of the electrode plate groups. Heat is applied to the collector plates 21, 22 as they are pressed against the edges of the electrode plates 18, 19, the collector plates 21, 22 remain in secure contact with the electrode plates during the welding, thus achieving secure bond therewith.

For the welding, with a single or a plurality of electronic beam 28 or using any other non-contact type heat source, heat is applied to the collector plates 21, 22 on the opposite surface of the electrode plate group along a line in the direction in which the electrode plates are stacked. Therefore, welding can be performed at high speed without affecting other parts of the electrode plate group that is in tight contact with the collector plates. Since the electrode plates 18, 19 are welded together along a plurality of lines in the plate-stacking direction, they can be securely bonded to the collector plates 21, 22.

The plurality of corrugated portions 29 that extend in the plate-stacking direction are formed at suitable intervals, whereby, the edges of the group of positive electrode plates 18 and the edges of the negative electrode plates 19 are reliably bonded to the collector plates 21, 22 respectively at several locations. Thus an electrode plate unit 5, wherein the collector plates 21, 22 and the electrode plates 18, 19 are securely bonded together, can be obtained.

The solder material 30 is attached to the corrugated portions 29 of the collector plates 21, 22 that are in contact with the lateral edges of the electrode plates 18, 19. Since the solder material melts at a relatively low temperature, the collector plates 21, 22 can be bonded to the edges of the electrode plates 18, 19 without arising any problems caused by thermal effect to the electrode plates 18, 19. Further, since both of the collector plates 21, 22 and the electrode plates 18, 19 are mainly composed of nickel, they can be favorably bonded together to constitute an electrode plate unit 5 for a nickel-alkaline rechargeable battery.

The electronic beams 28 for heat application are irradiated within a vacuum, so that the metal will not oxidize by the heat during the welding. Due to the absence of any oxide films, no welding defects are formed and bonding can be accomplished favorably, and the battery performance will not deteriorate. Moreover, since the collector plates 21, 22 are demagnetized as being coupled to the electrode plates 18, 19 before applying heat with the electronic beams 28, any magnetic force that the collector plates 21, 22 may have acquired during the fabrication or transportation process can be removed, whereby electronic beams 28 will not be affected by a magnetic force, and bonding can be accomplished favorably.

Next, modifications of the corrugated portion 29 in the collector plates 21, 22 will be described. Instead of forming several corrugated portions 29 as shown in FIGS. 12A–12D, wherein a groove 29b is formed on the top of the ridge 29a on the backside, the corrugated portion may simply be formed as an groove as shown in FIGS. 13A–13D, the backside of which protrudes as a ridge 29a on the side facing the lateral end surface of the electrode plates 18, 19. The solder material 30 is attached on the ridge 29a. Reference numeral 32 in FIGS. 13A–13C represents a connection projection that is formed to protrude at one end of the collector plate 21 or 22. The connection projection 32 is inserted into the connection hole 7 formed in the short lateral walls of the cell cases 3, so that the leading ends 32a of two connection projections 32 of the collector plates in two neighboring cells 3 are abutted, these being welded together. Thus, according to this structure, the collector plates 21, 22 of adjacent cells 6 can be directly connected without using a connection fitting 9.

Figure 14A:
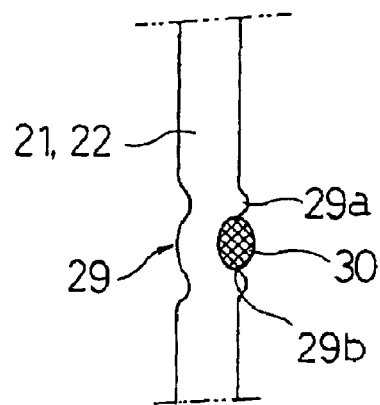
FIGS. 14A–14E are diagrams given in explanation of various modifications of the arrangement of a corrugated portion of the collector plate and a nickel solder material attached thereto.
Figure 14B:
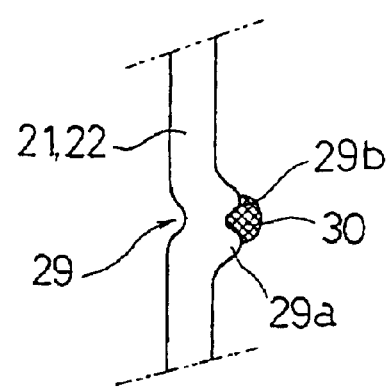
Figure 14C:
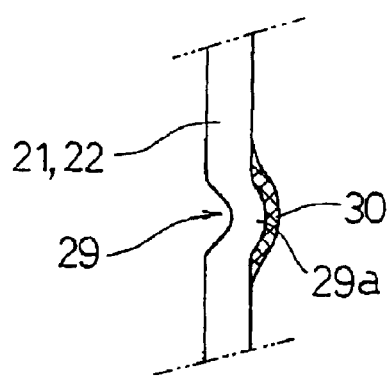
Figure 14D:
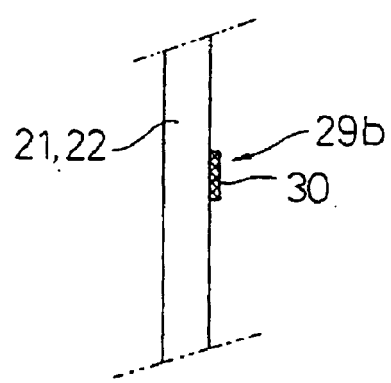
Figure 14E:
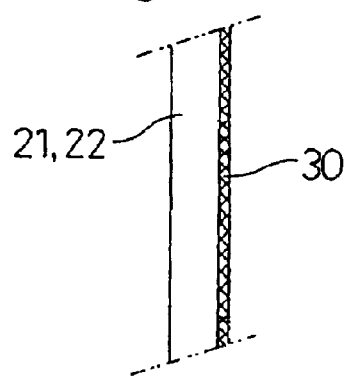

The shape of the corrugated portion 29 and the arrangement of the solder material 30 can variously be modified as shown in FIGS. 14A–14E. FIG. 14A shows one example that is basically the same as that shown in FIG. 12D, but with the surface of the solder material 30 filled in the groove 29b protruding slightly more than the ridge 29a. FIG. 14B shows another example wherein the ridge 29a is formed to protrude rather sharply, with a narrower and shallower groove 29b being formed on the top thereof, so that the solder material 30 can be projected more prominently. FIG. 14C shows yet another example which is basically the same as that shown in FIG. 13D, but with the ridge 29a being protruded higher and more sharply, and the solder material 30 being attached on the top of the ridge 29a and over the both sides thereof. FIG. 14D shows yet another example wherein the solder material 30 is applied in a strip on the surface of the collector plate 21 or 22, so that the solder material 30 itself constitutes a ridge 29b. FIG. 14E shows yet another example, wherein the solder material 30 is applied over the surface of the collector plates 21, 22 by non-electrolytic plating. The thickness of the solder material 30 may suitably be set within the range of 20 to 200 μm.

Figure 15A:
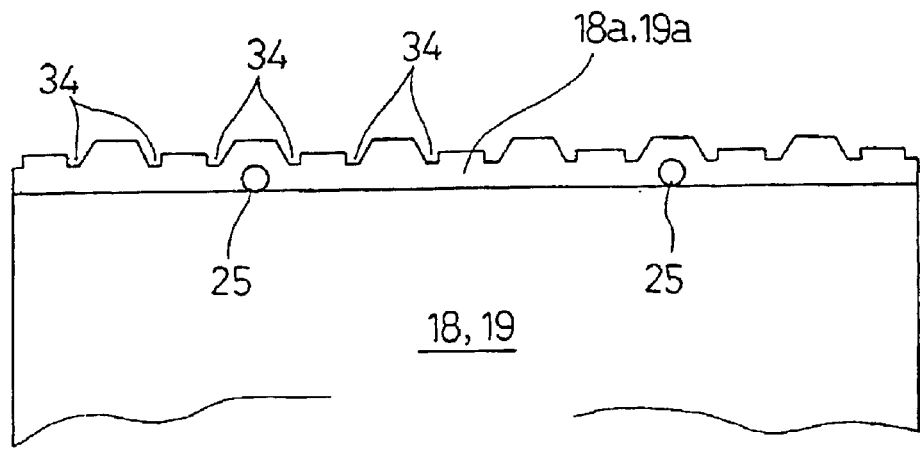
FIG. 15A is a front view showing one modified example of a lead portion of the electrode plate.
Figure 15B:
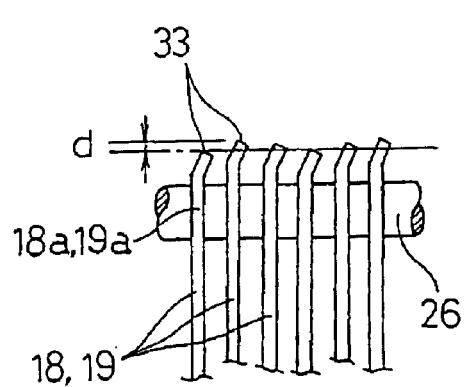
FIGS. 15B and 15C are diagrams given in explanation of another modified example.
Figure 15C:
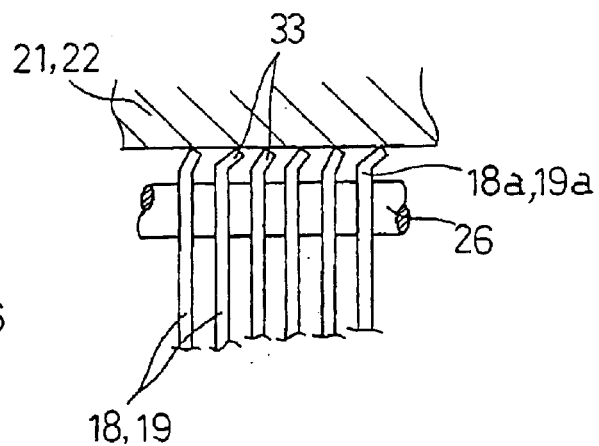
Figure 15D:
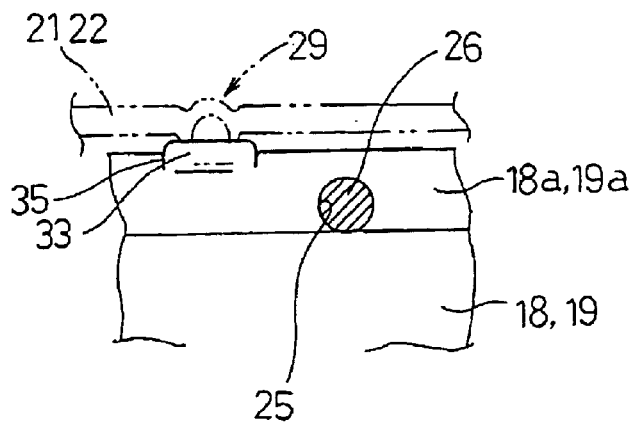
FIG. 15D is a partial front view showing yet another modified example.

FIGS. 15A–15D show various modifications to the electrode plates 18, 19. While the lead portions 18a, 19a of the electrode plates 18, 19 have been described as being straight at lateral edges in the foregoing embodiments, FIG. 15A shows one example of modification, wherein the edge of the lead portion 18a or 19a of the electrode plate 18 or 19 is formed with cuts or indents 34, so that the portions to be welded to the collector plate 21 or 22 can be bent more easily. Alternatively, the lateral edges of the lead portions 18a, 19a of the positive and negative electrode plates 18, 19 can be provided with bent portion 33 as shown in FIG. 15B. By doing so, even when, because of the dimensional tolerances for example, there is a difference d in the position of the lateral edges of the electrode plates 18, 19 that are aligned straight by the locating pins 26, the edge position of the electrode plates 18, 19 can be aligned more easily along a straight line as shown in FIG. 15C when a collector plate 21 or 22 is pressed against the electrode plates, because of the bent portion 33 smoothly bending and adjusting, so that the edges of the electrode plates 18, 19 together form a uniform, flat end surface, which will be in favorable contact with the collector plates 21, 22. More preferably, the examples shown in FIG. 15A and FIGS. 15B, 15C can be applied in combination, such that bent portions 33 are formed by making cuts or slits 35 on both sides of the bent portions 33 as shown in FIG. 15D, at locations corresponding to the corrugated portions 29 of the collector plates 21, 22.

Figure 16A:
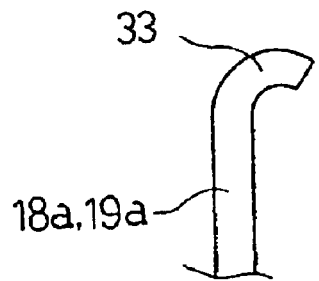
FIGS. 16A and 16B are diagrams given in explanation of another modified examples of the lead portion of the electrode plate.
Figure 16B:
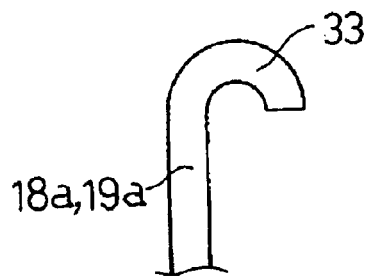
Figure 17:
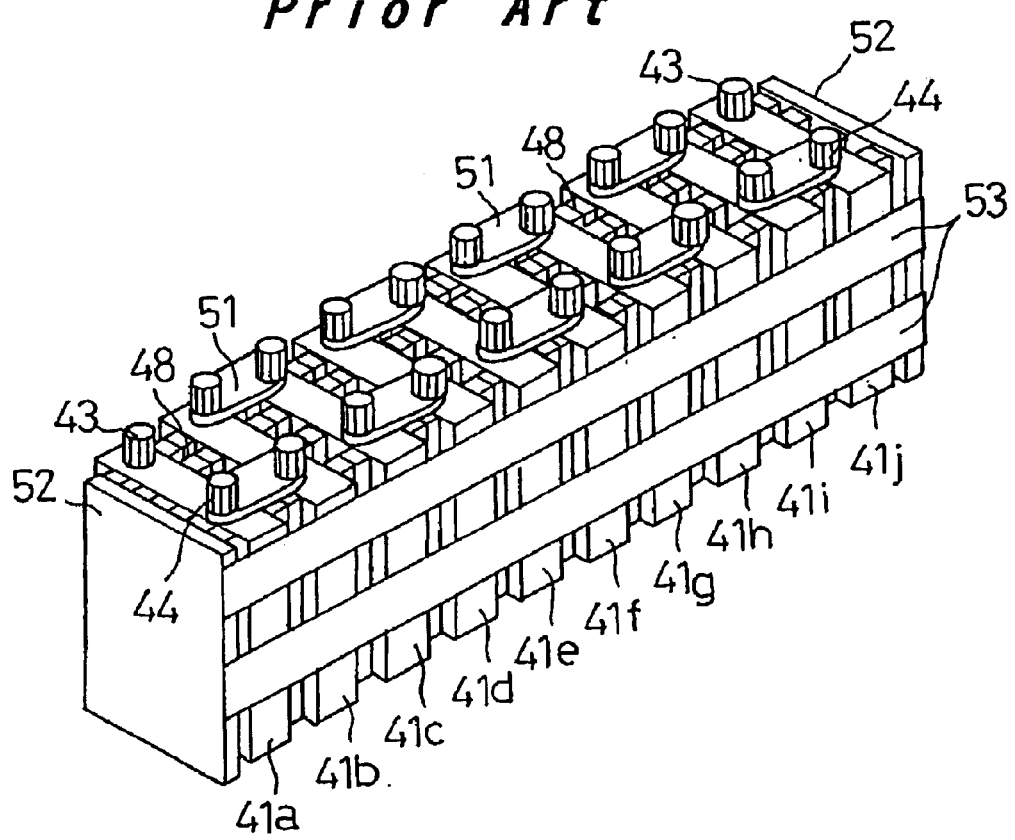
FIG. 17 is an external perspective view of a conventional battery module.
Figure 18:
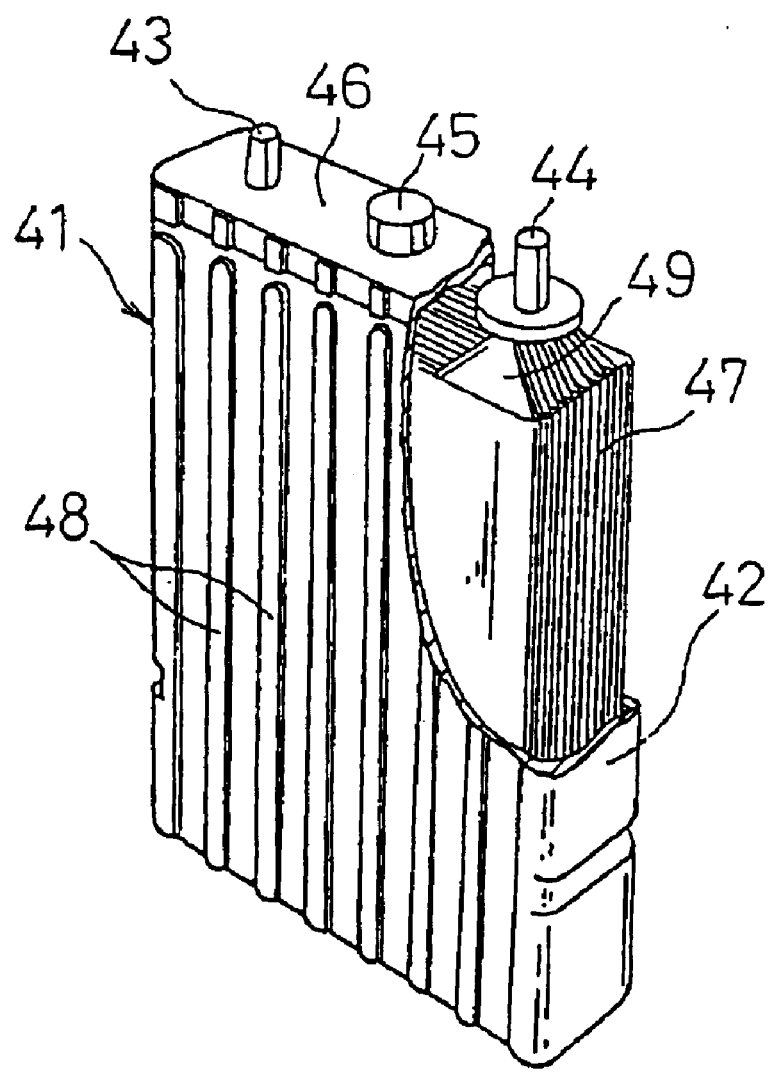
FIG. 18 is a partially cutaway perspective view of a cell of the same conventional example.

The shape of the bent portion 33 should not be limited to the example shown in FIGS. 15B and 15C, wherein the edge of the electrode plate is bent at an angle, but can be variously arranged, such as to be bent round at more than 90° as shown in FIG. 16A, or bent round at nearly 180° as shown in FIG. 16B.

In the foregoing embodiment, a method of attaching the solder material 30 on the corrugated portions 29 of the collector plates 21, 22, wherein a row material of solder paste is applied and reflowed, has been described as one example. However, the solder material 30 can be attached by any other means, for example, using an adhesive, or by thermal welding.

Alternatively, a material that is similar to the nickel solder material 30, such as a metal alloy comprising nickel, can be applied over the entire surface of the collector plates 21, 22 by a non-electrolytic plating method or the like. In the case wherein the collector plates 21, 22 are made of a nickel-plated steel sheet, a material that is similar to that of the nickel solder paste 30 may suitably selected for the plating of the steel sheet. In this case, a ridge of solder material 30 can be formed by locally increasing the thickness of the nickel plate.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery comprising an electrode plate unit, the electrode plate unit including:
   a group of electrode plates comprising a plurality of positive electrode plates and a plurality of negative electrode plates that are alternately stacked upon one another with intervening separators therebetween, wherein:
      edges of said plurality of positive electrode plates protrude beyond edges of said plurality of negative electrode plates on one side of said group of electrode plates, and
      edges of said plurality of negative electrode plates protrude beyond edges of said plurality of positive electrode plates on an opposite side of said group of electrode plates;
   a positive electrode collector plate attached to said protruding edges of said plurality of positive electrode plates and having a plurality of parallel positive electrode collector plate channels each having raised edges protruding beyond a plane defined by said positive electrode collector plate, said raised edges of said positive electrode collector plate channels on a side of said positive electrode collector plate attached to said protruding edges of said plurality of positive electrode plates;
   a negative electrode collector plate attached to said protruding edges of said plurality of negative electrode plates and having a plurality of parallel negative electrode collector plate channels each having raised edges protruding beyond a plane defined by said negative electrode collector plate, said raised edges of said negative electrode collector plate channels on a side of said negative electrode collector plate attached to said protruding edges of said plurality of negative electrode plates; and
   a planar portion extending between adjacent said channels of at least one of said positive electrode collector plate and said negative electrode collector plate.

2. The battery according to claim 1, wherein at least one of a said positive electrode collector plate channel and a said negative electrode collector plate channel extends along a respective at least one positive electrode collector plate and said negative electrode collector plate, in a direction substantially parallel to the direction in which said positive electrode plates and said negative electrode plates are stacked.

3. The battery according to claim 1, wherein said positive electrode collector plates and said negative electrode collector plates are made of one of nickel sheet and nickel-plated steel sheet.

4. The battery according to claim 1, further comprising:
   a solder material attached between said positive electrode collector plate and said protruding edges of said plurality of positive electrode plates, and attached between said negative electrode collector plate and said protruding edges of said plurality of negative electrode plates.

5. The battery according to claim 4, wherein:
   said solder material is configured to be applied to said positive and negative electrode collector plates prior to being applied to said protruding edges of said plurality of positive and negative electrode plates; and
   said solder material is configured to be reflowed after being applied in said channels of said positive and negative electrode collector plates.

6. A battery comprising an electrode plate unit, the electrode plate unit including:
   a plurality of positive electrode plates and a plurality of negative electrode plates that are alternately stacked upon one another with intervening separators therebetween; and
   an electrode collector plate attached to protruding edges of at least one of said plurality of positive electrode plates and said plurality of negative electrode plates;
   a plurality of bent portions, each bent portion of said plurality of bent portions respectively formed by bending a portion of an edge of said protruding edges, wherein not all of said bent portions on a said edge are uniform in length and said plurality of bent portions form a uniform, flat end surface at a lateral end of the electrode plate unit.

7. A battery comprising an electrode plate unit, the electrode plate unit including:
   a group of electrode plates comprising a plurality of positive electrode plates and a plurality of negative electrode plates that are alternately stacked upon one another with intervening separators therebetween, wherein:
      edges of said plurality of positive electrode plates protrude beyond edges of said plurality of negative electrode plates on one side of said group of electrode plates, each said edge of said edges of said plurality of positive electrode plates having a slit therein; and
      edges of said plurality of negative electrode plates protrude beyond edges of said plurality of positive electrode plates on an opposite side of said group of electrode plates, each said edge of said edges of said plurality of negative electrode plates having a slit therein;
   a positive electrode collector plate attached to said protruding edges of said plurality of positive electrode plates and having a plurality of parallel positive electrode collector plate channels each having raised edges protruding beyond a plane defined by said positive electrode collector plate, said raised edges of said positive electrode collector plate channels on a side of said positive electrode collector plate attached to said protruding edges of said plurality of positive electrode plates;
   a negative electrode collector plate attached to said protruding edges of said plurality of negative electrode plates and having a plurality of parallel negative electrode collector plate channels each having raised edges protruding beyond a plane defined by said negative electrode collector plate, said raised edges of said negative electrode collector plate channel on a side of said negative electrode collector plate attached to said protruding edges of said plurality of negative electrode plates; and
   a planar portion extending between adjacent said channels of at least one of said positive electrode collector plate and said negative electrode collector plate.

8. A battery comprising an electrode plate unit, the electrode plate unit including:
   a plurality of positive electrode plates and a plurality of negative electrode plates that are alternately stacked upon one another with intervening separators therebetween, lead portions of each of said plurality of positive electrode plates and lead portions of each of said plurality of negative electrode plates extending along a respective edge thereof;

a collector plate attached to said lead portions of at least one of said plurality of positive electrode plates and said plurality of negative electrode plates; and a plurality of bent portions, each bent portion of said plurality of bent portions respectively formed by bending a portion of a said lead portion of said plurality of positive electrode plates and said plurality of negative electrode plates, wherein not all of said bent portions on a said lead portion are uniform in length and said plurality of bent portions form a uniform, flat end surface at a lateral end of the electrode plate unit, wherein said lead portions comprise a locator configured to position said edges of at least one of said positive electrode plates and said negative electrode plates with respect to said collector plate.

9. The battery according to claim 8, wherein said locator is one of a hole and a cut-out.

10. The battery according to claim 8, wherein said lead portions of at least one of said plurality of positive electrode plates and said plurality of negative electrode plates comprise a reinforcing material.

* * * * *